(No Model.)
W. GARROWAY.
PROCESS OF MAKING ALKALINE SILICATES AND NITRIC ACID.
No. 590,143. Patented Sept. 14, 1897.
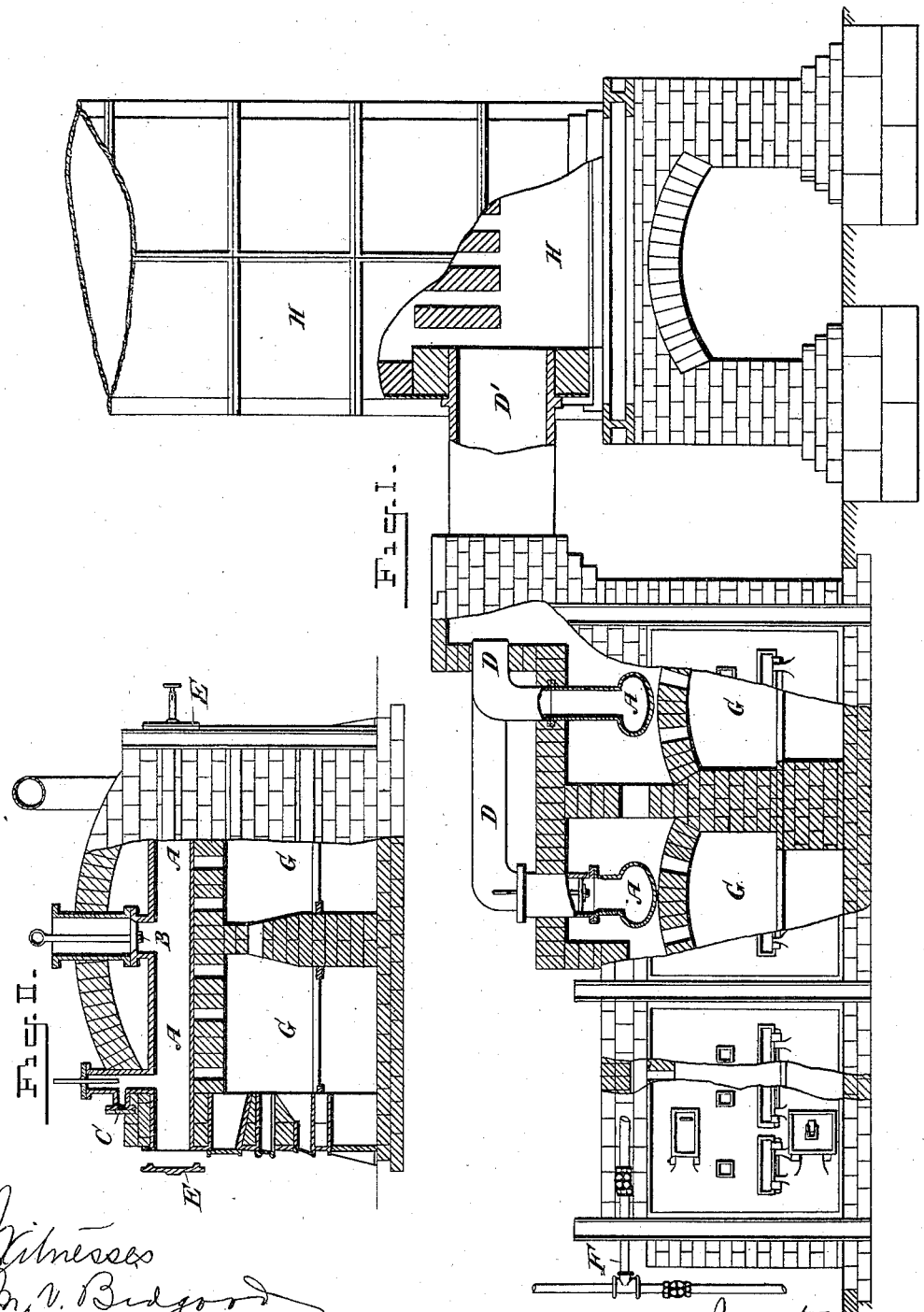

United States Patent Office.

WILLIAM GARROWAY, OF GLASGOW, SCOTLAND.

PROCESS OF MAKING ALKALINE SILICATES AND NITRIC ACID.

SPECIFICATION forming part of Letters Patent No. 590,143, dated September 14, 1897.

Application filed March 20, 1897. Serial No. 628,402. (No specimens.)

*To all whom it may concern:*

Be it known that I, WILLIAM GARROWAY, manufacturing chemist, a subject of the Queen of the United Kingdom of Great Britain and Ireland, residing at Netherfield Chemical Works, Glasgow, in the county of Lanark, Scotland, have invented new and useful Improvements in the Manufacture of Silicates of Sodium and Potassium, of Nitric and Sulfuric Acids, and of Caustic Soda and Potash, of which the following is a specification.

This invention relates to improvements in the manufacture of silicates of sodium and potassium and of nitric and sulfuric acids; and it has also for its object the manufacture of caustic soda and caustic potash in a cheap and efficient manner and without the use of any expensive reagent or material. For this purpose I take nitrate of soda or of potash with silica in the form of ground sand or flint and heat them in a suitable furnace or retort, over which or through which I pass superheated steam and hot air. Silicate of the alkaline base is formed, while nitric acid is evolved and may be condensed by any known means or sent direct from the vessel in which it is evolved to the chamber for the manufacture of vitriol. The retort or vessel may be heated by any ordinary means, but when the process is employed in connection with the production of vitriol it may be advantageously placed on the pyrites-burners in order to utilize the heat. When the action has ceased, the silicate of soda or of potash that remains in the retort is withdrawn and is treated with water and steam. Some sand or silica remains insoluble, but the silicate of soda or potash dissolves and forms a solution, which may either be disposed of directly or after being boiled down or concentrated to the desired strength for the manufacture of soap-powders or in the process of rectifying mineral oil, or the silicate of soda or potash may be treated with lime to precipitate the silica, while the caustic soda or potash remains in solution and may be treated by any known means, and the insoluble silicate may be dried and treated for the manufacture of cement.

In carrying out my invention I proceed as follows: I mix together from one hundred to two hundred parts, by weight, of sand or ground flint with one hundred parts, by weight, or thereabout of nitrate of soda or its equivalent of nitrate of potash, and place this mixture in a retort or vessel, preferably of cast-iron, which, in the case of the manufacture of vitriol, is built in the kiln and is heated by the flames or heat of the burning pyrites or sulfur passing over or around it. I then pass superheated steam through the hot charge, and a little hot air when required, which effects the decomposition, nitric acid being evolved, which is conducted directly into the vitriol-chambers or the Glover tower, or it is condensed for sale or treated in any known way. The mixture of silicate of soda or of potash and sand remaining in the retort is now withdrawn, treated with water and steam, by which the silicate is obtained in solution.

In carrying out my process when it is employed in connection with the manufacture of vitriol or sulfuric acid the apparatus and plant I employ will be readily understood from the accompanying drawings and the following description.

Fig. 1 is an elevation partly in section. Fig. 2 is a cross-section.

A is the retort, of which there may be any number; B, the charging-door, by which the materials are introduced into the retort; C, a steam-pipe; D and D', pipes leading to sulfuric-acid chambers or Glover tower for conveying the evolved nitric acid thereto; E E, drawing-off or discharging doors.

F is the superheated steam-supply pipe.

G G are the pyrites or sulfur burners.

H is the Glover tower.

Two retorts may be used for a set of six chambers, but that will of course depend on the capacity of both the retorts and the chambers. The one retort may be opened and be charged or discharged without in the least interfering with the process going on in the other.

When the process is not intended to be applied in connection with the manufacture of sulfuric acid, the retorts may be heated by the combustion of ordinary fuel in any suitable furnace or in any well-known manner.

I claim—

1. The process for producing alkaline silicates and nitric acid, consisting in heating silica and an alkaline nitrate with superheated steam, as hereinbefore described.

2. The process for producing caustic alkalies which consists in heating silica and an alkaline nitrate with superheated steam and acting on the resulting alkaline silicate, with lime.

WILLIAM GARROWAY.

Witnesses:
WILLIAM STEWART,
R. W. CASSELS.